(12) United States Patent
Sugimoto et al.

(10) Patent No.: US 11,655,048 B2
(45) Date of Patent: May 23, 2023

(54) SELF-CENTERING LANDING PLATFORM

(71) Applicant: Ford Global Technologies, LLC, Dearborn, MI (US)

(72) Inventors: Yuji Sugimoto, Dearborn, MI (US); James Carthew, Dearborn, MI (US); Aditya Singh, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 497 days.

(21) Appl. No.: 16/966,225

(22) PCT Filed: Feb. 14, 2018

(86) PCT No.: PCT/US2018/018149
§ 371 (c)(1),
(2) Date: Jul. 30, 2020

(87) PCT Pub. No.: WO2019/160540
PCT Pub. Date: Aug. 22, 2019

(65) Prior Publication Data
US 2021/0047053 A1   Feb. 18, 2021

(51) Int. Cl.
*B64U 70/97* (2023.01)
*B64F 1/22* (2006.01)
*B64U 70/90* (2023.01)
*B64C 39/02* (2023.01)
*F16H 1/10* (2006.01)
(Continued)

(52) U.S. Cl.
CPC ............... *B64F 1/22* (2013.01); *B64U 70/90* (2023.01); *B64C 39/024* (2013.01); *B64U 70/00* (2023.01); *F16H 1/10* (2013.01); *F16H 25/16* (2013.01)

(58) Field of Classification Search
CPC .. B64F 1/007; B64F 1/125; B64F 1/22; B64C 2201/18; B64U 70/00; B64U 70/90; B64U 70/97
See application file for complete search history.

(56) References Cited

U.S. PATENT DOCUMENTS 9,387,940 B2 * 7/2016 Godzdanker ............. E01F 3/00
9,481,458 B2 * 11/2016 Casado Magaña ... B64C 39/024
(Continued)

FOREIGN PATENT DOCUMENTS

CN      107380038 A    11/2017
CN      206790194 U    12/2017
(Continued)

OTHER PUBLICATIONS

International Search Report of the International Searching Authority for PCT/US2018/018149 dated May 4, 2018.

*Primary Examiner* — Philip J Bonzell
(74) *Attorney, Agent, or Firm* — Brandon Hicks; Eversheds Sutherland (US) LLP

(57) ABSTRACT

Example landing platform systems and methods are described. In one implementation, a landing platform includes a top plate configured to support an unmanned aerial vehicle (UAV), where the top plate has a plurality of slots therethrough. A rotating plate is located adjacent the top plate and includes multiple centering pins extending therefrom and extending through the plurality of slots in the top plate. A motor is capable of rotating the rotating plate, which causes the multiple centering pins to center the UAV on the top plate.

20 Claims, 9 Drawing Sheets

(51) Int. Cl.
*F16H 25/16* (2006.01)
*B64U 70/00* (2023.01)

(56) References Cited

U.S. PATENT DOCUMENTS

| | | | |
|---|---|---|---|
| 9,656,749 B1* | 5/2017 | Hanlon | B64C 39/024 |
| 10,035,592 B1* | 7/2018 | Hanlon | G01M 1/10 |
| 10,414,517 B2* | 9/2019 | Wang | B64C 39/024 |
| 10,507,938 B2 | 12/2019 | Raz et al. | |
| 10,730,620 B1* | 8/2020 | Hanlon | B64C 39/024 |
| 10,934,019 B2* | 3/2021 | Stamatovski | B64F 1/007 |
| 11,220,352 B2* | 1/2022 | Stamatovski | B64F 1/007 |
| 11,524,796 B2* | 12/2022 | Wang | B64C 39/024 |
| 2003/0024357 A1 | 2/2003 | Hofmann et al. | |
| 2014/0124621 A1* | 5/2014 | Godzdanker | B64F 1/22 244/110 E |
| 2014/0319272 A1* | 10/2014 | Casado Magana | B60L 58/10 244/110 E |
| 2016/0144982 A1 | 5/2016 | Sugumaran | |
| 2017/0240062 A1* | 8/2017 | Jaiswal | B60L 53/37 |
| 2017/0253349 A1* | 9/2017 | Wang | B64C 39/024 |
| 2018/0148170 A1* | 5/2018 | Stamatovski | B64F 1/24 |
| 2019/0002128 A1 | 1/2019 | Raz et al. | |
| 2019/0023416 A1* | 1/2019 | Borko | B64F 1/222 |
| 2020/0079529 A1 | 3/2020 | Raz et al. | |
| 2020/0150789 A1* | 5/2020 | Woody, V | B66C 7/08 |
| 2020/0239160 A1* | 7/2020 | Cheng | B64F 5/60 |
| 2020/0310465 A1* | 10/2020 | Garth | G05D 1/0684 |
| 2021/0031947 A1* | 2/2021 | Wankewycz | B60L 53/305 |
| 2021/0214102 A1* | 7/2021 | Geng | G08G 5/0026 |
| 2022/0073214 A1* | 3/2022 | Liske | B64F 1/22 |

FOREIGN PATENT DOCUMENTS

| | | | | |
|---|---|---|---|---|
| CN | 108482697 A | * | 9/2018 | |
| CN | 109131921 A | * | 1/2019 | B64F 1/007 |
| CN | 111977008 A | * | 11/2020 | |
| CN | 108973746 B | * | 5/2021 | B64F 1/125 |
| CN | 111657252 B | * | 11/2021 | A01M 7/0025 |
| DE | 10135456 C1 | | 10/2002 | |
| DE | 202007008334 U1 | | 11/2007 | |
| DE | 102012008776 B4 | | 3/2014 | |
| JP | H07266277 A | | 10/1995 | |
| WO | 2016/143806 A1 | | 9/2016 | |
| WO | 2018/015960 A1 | | 1/2018 | |
| WO | WO-2019232753 A1 | * | 12/2019 | |

* cited by examiner

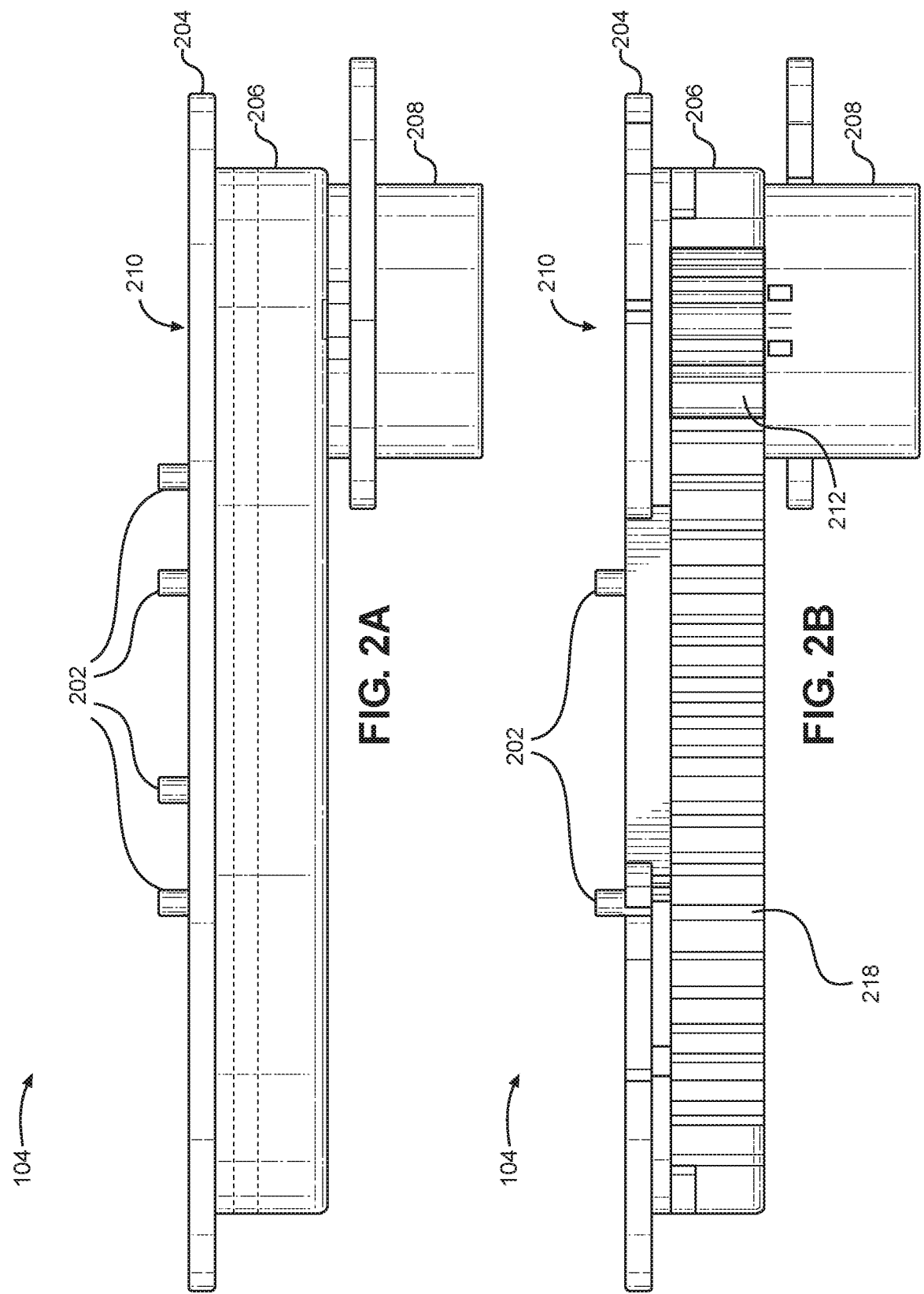

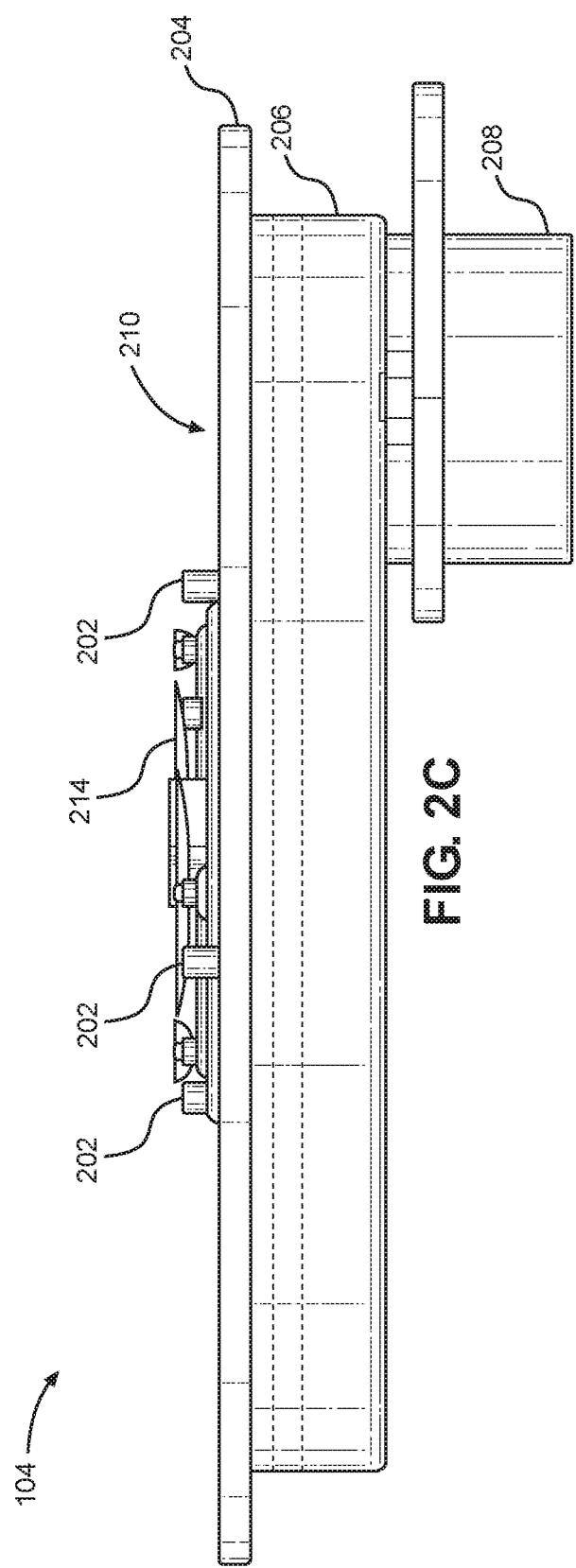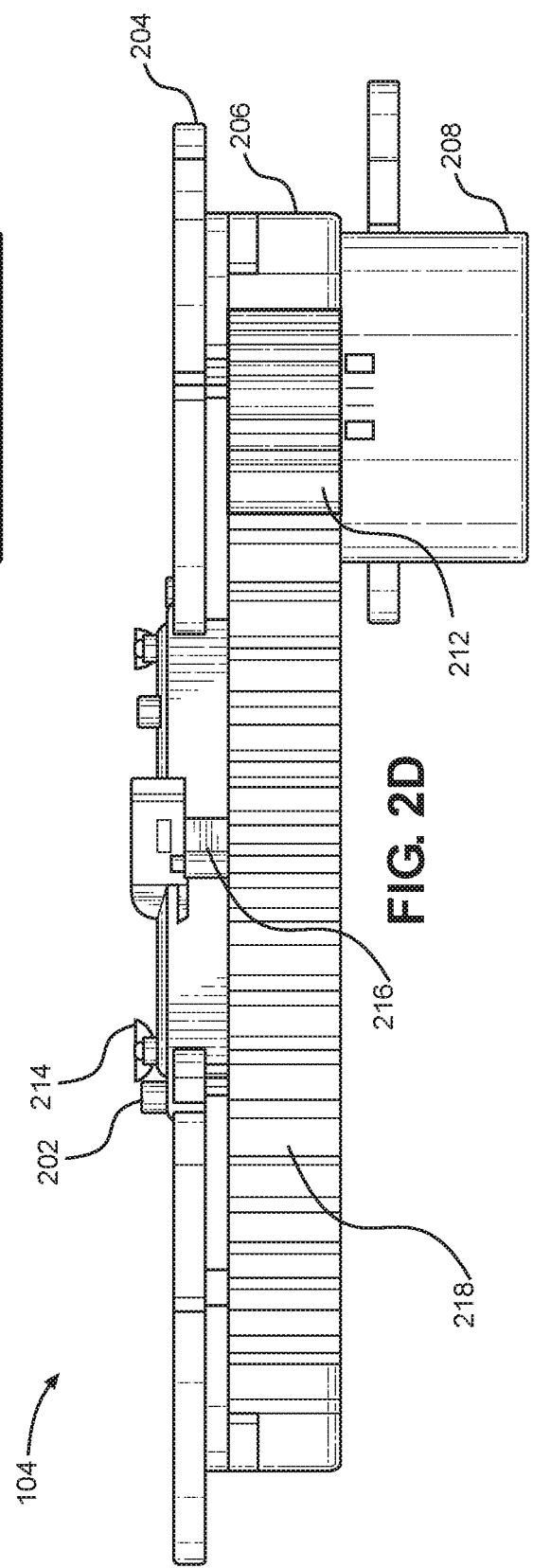

SELF-CENTERING LANDING PLATFORM

TECHNICAL FIELD

The present disclosure relates to systems and methods that support the landing of unmanned aerial vehicles (UAVs).

BACKGROUND

Landing an unmanned aerial vehicle (UAV) at a specific location can be difficult. Precise landing locations are hindered by turbulence generated by the air displaced by the UAV's propellers and reflected by the landing surface. If the UAV is landing on a moving surface, such as a moving vehicle, precision landings become more difficult. In many situations, a UAV must be precisely positioned to successfully load/unload payload, attach charging systems, and the like. Thus, it is necessary to properly position a UAV on a landing platform to support loading/unloading payload and other activities.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

FIGS. 2A-2D illustrate an embodiment of a landing platform capable of receiving an unmanned aerial vehicle (UAV).

DETAILED DESCRIPTION

Figure 1:
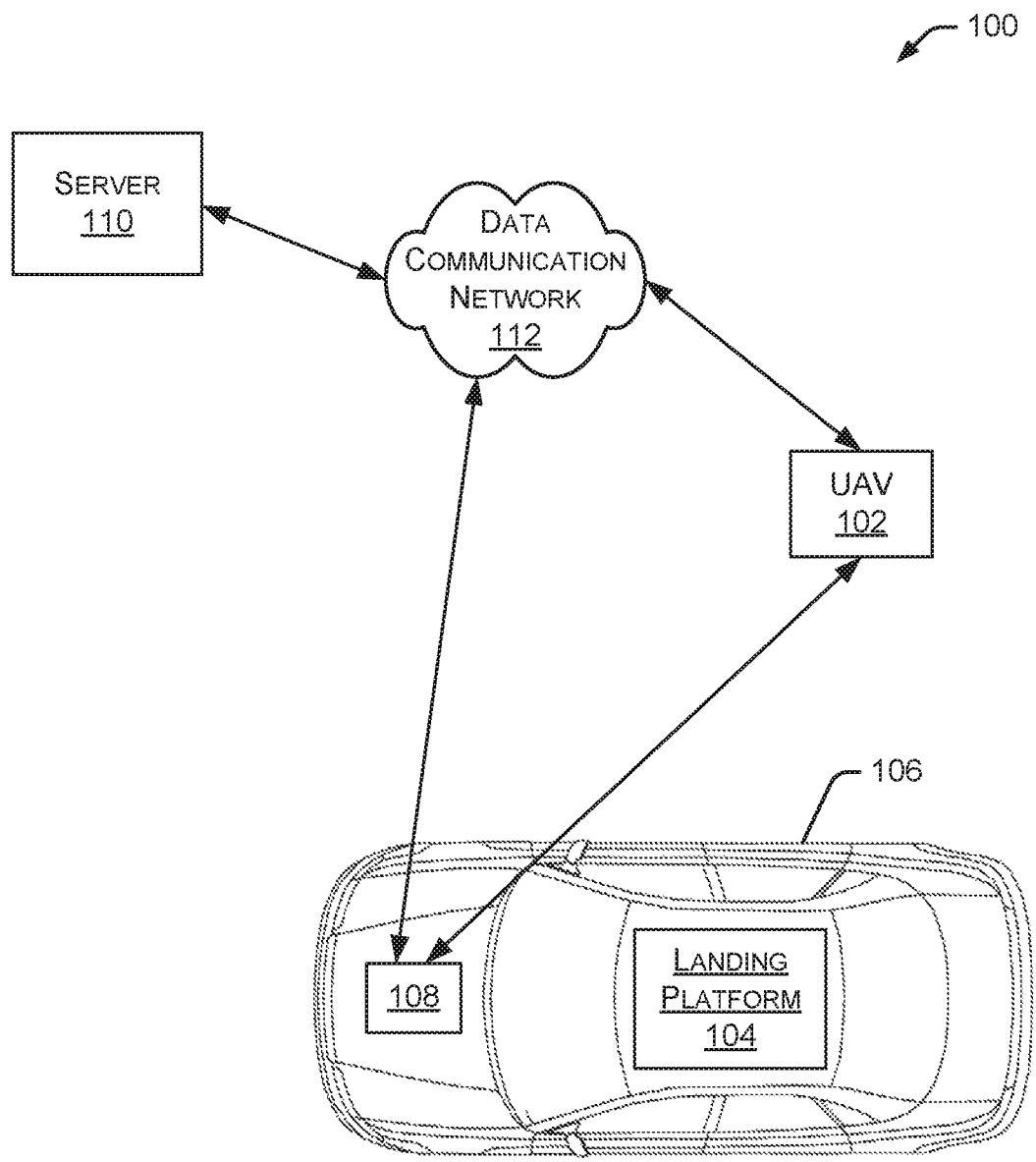
FIG. 1 is a block diagram depicting an environment within which an example embodiment may be implemented.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed herein may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein for purposes of illustration, and are not intended to be limiting. Embodiments of the present disclosure may be implemented in further types of devices, as would be known to persons skilled in the relevant art(s).

At least some embodiments of the disclosure are directed to computer program products comprising such logic (e.g., in the form of software) stored on any computer useable medium. Such software, when executed in one or more data processing devices, causes a device to operate as described herein.

FIG. 1 is a block diagram depicting an environment 100 within which an example embodiment may be implemented. An unmanned aerial vehicle (UAV) 102 may land on, and take off from, a landing platform 104 mounted to a vehicle 106 (e.g., mounted to the roof of vehicle 106). Vehicle 106 may be any type of vehicle, such as a car, truck, van, bus, train, and the like. In some embodiments, vehicle 106 may be moving while UAV 102 lands on landing platform 104. In particular implementations, vehicle 106 is a delivery vehicle that carries at least one item to be delivered by UAV 102. In alternate embodiments, landing platform 104 may be mounted to any type of device or structure, such as a building, loading dock, loading platform, and the like.

UAV 102 can be any type of unmanned aerial vehicle capable of maneuvering to land on, and take off from, any type of landing platform. In some embodiments, UAV 102 is a multicopter having two or more rotors (e.g., motors) and associated propellers. In particular implementations, UAV 102 has a single rotor and associated propeller. UAV 102 may also be referred to as a drone or a remotely piloted aircraft. As discussed in greater detail herein, landing platform 104 provides a temporary location for one or more UAVs 102 to land and receive payload, deliver payload, recharge, "piggy back" on vehicle 106, transfer data to or from UAV 102 (e.g., image data collected by UAV 102) and the like.

As shown in FIG. 1, vehicle 106 includes a UAV management system 108 that is capable of wirelessly communicating with UAV 102. Any communication protocol may be used for communications between UAV management system 108 and UAV 102, such as 3G, 4G LTE, WiFi, and the like. In some embodiments, UAV management system 108 provides flight guidance to UAV 102 when landing on, or taking off from, landing platform 104. Additionally, UAV management system 108 may provide instructions to landing platform 104 to position (e.g., center) UAV 102 on landing platform 104, as discussed herein. In some embodiments, UAV management system 108 communicates with a server 110 via a data communication network 112. For example, UAV management system 108 may communicate data associated with UAV 102, vehicle 106, payload, and the like to server 110. Additionally, UAV management system 108 may receive data from server 110 associated with UAV 102, payload delivery instructions, and the like. Other types of data received by UAV management system 108 may include a calculated flight path for UAV 102, temporary flight restrictions, airspace flight restrictions, and localized models of obstructions near the delivery or in the flight path of UAV 102. Although landing platform 104 and UAV management system 108 are shown in FIG. 1 as separate systems or devices, in alternate embodiments management system 108 is integrated into landing platform 104.

Data communication network 112 includes any type of network topology using any communication protocol. Additionally, data communication network 112 may include a combination of two or more communication networks. In some embodiments, data communication network 112 includes a cellular communication network, the Internet, a local area network, a wide area network, or any other communication network.

In some embodiments, UAV 102 communicates directly with UAV management system 108. In other embodiments, UAV 102 communicates with server 110 (via data communication network 112), which then communicates with UAV management system 108.

It will be appreciated that the embodiment of FIG. 1 is given by way of example only. Other embodiments may include fewer or additional components without departing from the scope of the disclosure. Additionally, illustrated components may be combined or included within other components without limitation.

FIGS. 2A-2D illustrate an embodiment of landing platform 104 capable of receiving UAV 102. In particular, FIG. 2A is a side view of landing platform 104. As shown in FIG. 2A, landing platform 104 includes a top plate 204, a rotating plate 206, and a motor 208. In some embodiments, top plate 204 and rotating plate 206 are manufactured using a metal or plastic material such as aluminum, titanium, ABS (Acrylonitrile Butadiene Styrene), acrylic, nylon, and the like. Top plate 204 is adjacent rotating plate 206. Rotating plate 206 is attached to motor 208 such that when motor 208 is activated, it causes rotating plate 206 to rotate in a clockwise or counterclockwise direction. Motor 208 can be any type of motor, such as a stepper motor, a servo motor, a DC motor, and the like.

As discussed herein, multiple centering pins 202 extend through slots in top plate 204. Centering pins 202 extend from rotating plate 206 such that centering pins 202 move along the slots when rotating plate 206 is rotated by motor 208. In some embodiments, centering pins 202 extend through slots in rotating plate 206, as discussed herein. Thus, centering pins 202 are not necessarily rigidly mounted to rotating plate 206. As discussed in greater detail herein, the movement of centering pins 202 centers a UAV (not shown in FIG. 2A) on top plate 204. A top surface 210 of top plate 204 (i.e., the surface opposite rotating plate 206) is a landing surface that allows one or more UAVs to land on landing platform 104.

FIG. 2B is a cross-sectional side view of landing platform 104. In FIG. 2B, a pinion gear 212 attached to motor 208 engages an internal gear 218 attached to rotating plate 206. When motor 208 is activated, pinion gear 212 rotates on a shaft associated with motor 208. The engagement between pinion gear 212 and internal gear 218 causes rotating plate 206 to rotate in a clockwise or counterclockwise direction, depending on the rotational direction of the shaft associated with motor 208.

FIG. 2C is a side view of landing platform 104 with a UAV 214 located on landing platform 104. As shown in FIG. 2C, UAV 214 has landed on top surface 210 of top plate 204. UAV 214 is approximately centered on landing platform 204 by multiple centering pins 202.

FIG. 2D is a cross-sectional side view of landing platform 104 with UAV 214 located on landing platform 104. As shown in FIG. 2D, UAV 214 is approximately centered over an aperture 216 in top plate 204 and rotating plate 206. Aperture 216 allows access to the bottom of UAV 214 for loading payload, unloading payload, recharging UAV 214, and the like. Motor 208 is offset from aperture 216 such that the motor does not obstruct access to the UAV through the aperture.

As shown in FIGS. 2A-2D, landing platform 104 includes one motor 208 to control the movement of multiple centering pins 202. Since all centering pins 202 extend from the same rotating plate 206, all centering pins 202 move synchronously with one another. This approach eliminates the need for multiple motors (e.g., one motor to control each centering pin) and a control system to synchronize the multiple motors. In some embodiments, motor 208 can be mounted above landing platform 104, such as mounted to the top of top plate 204. In this configuration, the shaft of motor 208 would, for example, extend through an opening or aperture in top plate 204.

Figure 3A:
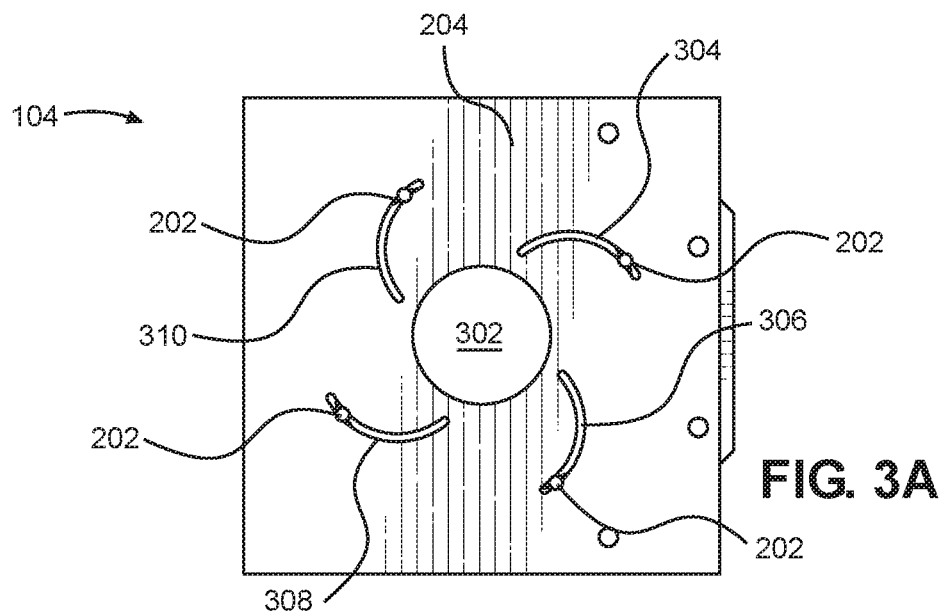
FIGS. 3A-3C illustrate additional details of the landing platform of FIGS. 2A-2D, according to one embodiment.
Figure 3B:
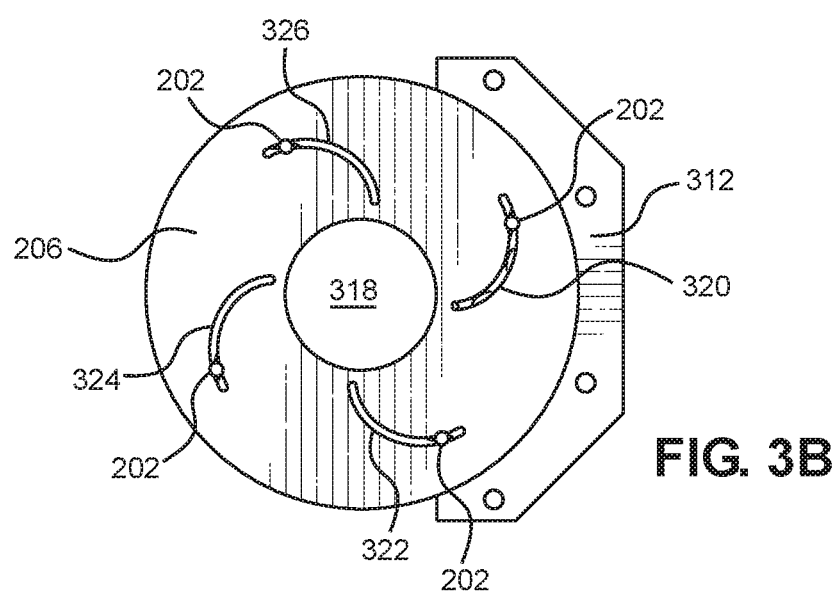
Figure 3C:
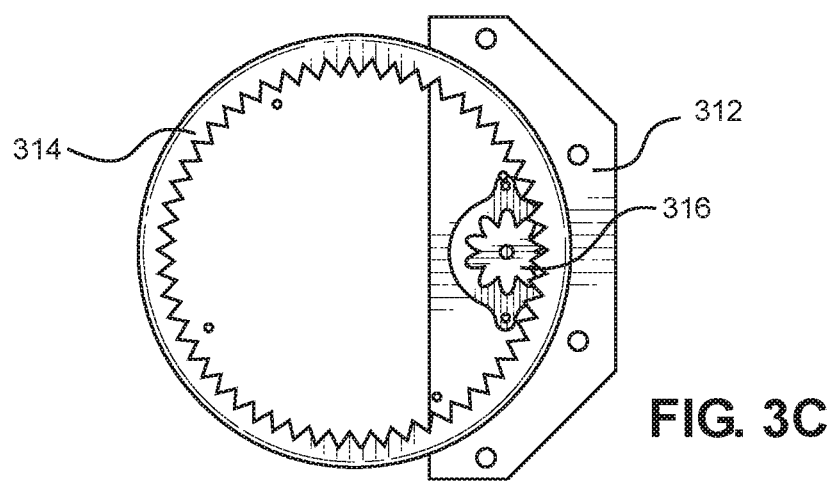

FIGS. 3A-3C illustrate additional details of the landing platform of FIGS. 2A-2D, according to one embodiment. In particular, FIG. 3A is a top view of landing platform 104. As shown in FIG. 3A, top plate 204 has multiple slots 304, 306, 308, and 310 with multiple centering pins 202 extend through slots 304-310. In the embodiment of FIG. 3A, each slot 304-310 has is curved (or arc-shaped) and the multiple centering pins 202 follow the curvature of slots 304-310 when rotating plate 206 is activated. For example, activation of motor 208, which causes rotation of rotating plate 206, causes the multiple centering pins 202 to move in a spiral motion toward the center of top plate 204. As further shown in FIG. 3A, top plate 204 has an aperture 302 approximately in the middle of top plate 204. As discussed herein, aperture 302 provides access to the bottom of a UAV that has landed on landing platform 104.

FIG. 3B is a top view of rotating plate 206 and a motor mount plate 312. As shown in FIG. 3B, motor mount plate 312 provides a structure for mounting motor 208 to landing platform 104. An aperture 318 in rotating plate 206 is positioned to align with aperture 302 in top plate 204 to allow access to the bottom of a UAV on landing platform 104. In some embodiments, motor mount plate 312 manufactured using a metal, plastic or wood material such as aluminum, titanium, ABS (Acrylonitrile Butadiene Styrene), acrylic, nylon, and the like.

Rotating plate 206 has multiple slots 320, 322, 324, and 326 with multiple centering pins 202 extend through slots 320-326. In the embodiment of FIG. 3B, each slot 320-326 has is curved (or arc-shaped) and the multiple centering pins 202 follow the curvature of slots 320-326 when rotating plate 206 is activated. For example, activation of motor 208, which causes rotation of rotating plate 206, causes the multiple centering pins 202 to move in a spiral motion toward the center of rotating plate 206.

In some embodiments, centering pins 202 are slidably attached (or slidably mounted) to rotating plate 206 and top plate 204. For example, the ends of each centering pin 202 may be flared (or otherwise enlarged) such that the ends of each pin are wider than the openings in slots 304-310 and wider than the openings in slots 320-326. Thus, centering pins 202 cannot fall out of slots 304-310 or slots 320-326, even when sliding within the slots. Centering pins 202 are free floating within slots 304-310 and slots 320-326. The rotary motion of rotating plate 206 and stationary top plate 204 forces centering pins 202 to move toward the center of landing platform 104 by following the slots in rotating plate 206 and/or following the slots in top plate 204. The spiral motion of centering pins 202 toward the center of landing platform 104 is caused by the positioning of slots 320-326 with respect to the positioning of slots 304-310. As shown in FIGS. 3A and 3B, slots 304-310 are not in direct alignment with slots 320-326. This specific alignment represents one embodiment of positioning slots 304-310 and slots 320-326 to cause the spiral motion of centering pins 202.

FIG. 3C is a top view of an actuation mechanism including an internal gear 314 and a pinion gear 316. As shown in FIG. 3C, pinion gear 316 engages with internal gear 314 such that rotation of pinion gear 316 causes the rotation of internal gear 314. Internal gear 314 is attached to rotating plate 206. Thus, rotation of internal gear 314 causes a corresponding rotation of rotating plate 206 and the multiple centering pins 202 extending from rotating plate 206. As discussed herein, pinion gear 316 is attached to motor 208 which is activated and deactivated to move the position of multiple centering pins 202.

Figure 4A:
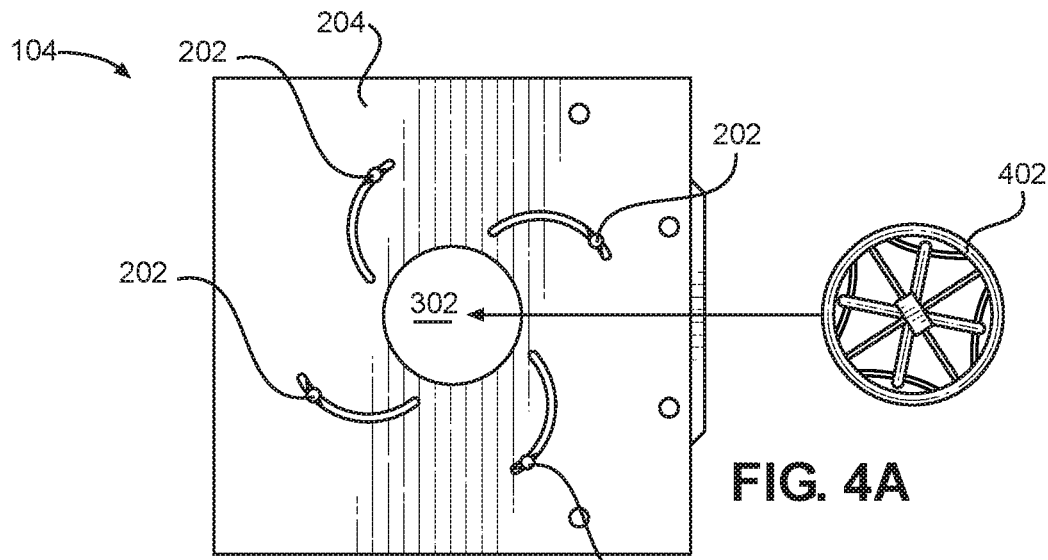
FIGS. 4A-4E illustrate an embodiment of centering a UAV on the landing platform of FIGS. 2A-2D.

FIGS. 4A-4E illustrate an embodiment of centering a UAV on the landing platform of FIGS. 2A-2D. As shown in FIG. 4A, a UAV 402 is approaching landing platform 104. In this example, the multiple centering pins 202 extending through top plate 204 are located away from aperture 302. This position of the multiple centering pins 202 provides a larger area for landing UAV 402. For example, the area "inside" the multiple centering pins 202 is maximized with centering pins 202 positioned as shown in FIG. 4A. Aperture 302 is shown at the approximate center of top plate 204.

Figure 4B:
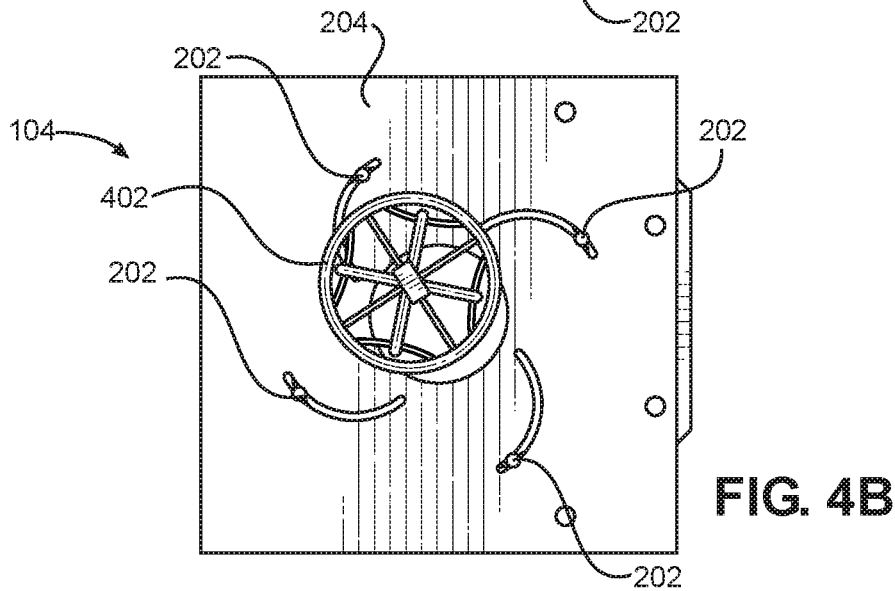

FIG. 4B shows the position of UAV 402 after landing on landing platform 104. The multiple centering pins 202 are in the same position as FIG. 4A. After UAV 402 has landed, motor 208 is activated to begin moving the multiple centering pins 202, as discussed below.

Figure 4C:
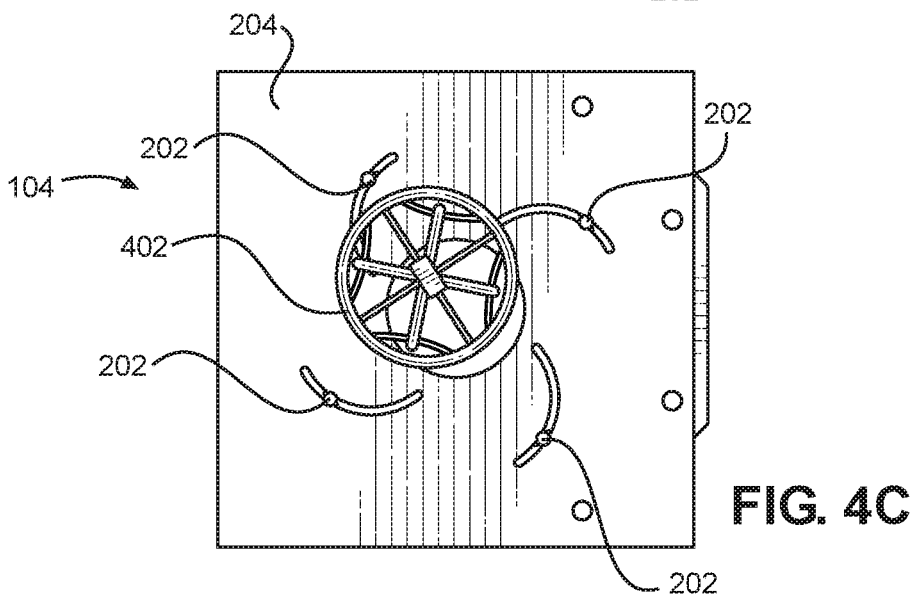
Figure 4D:
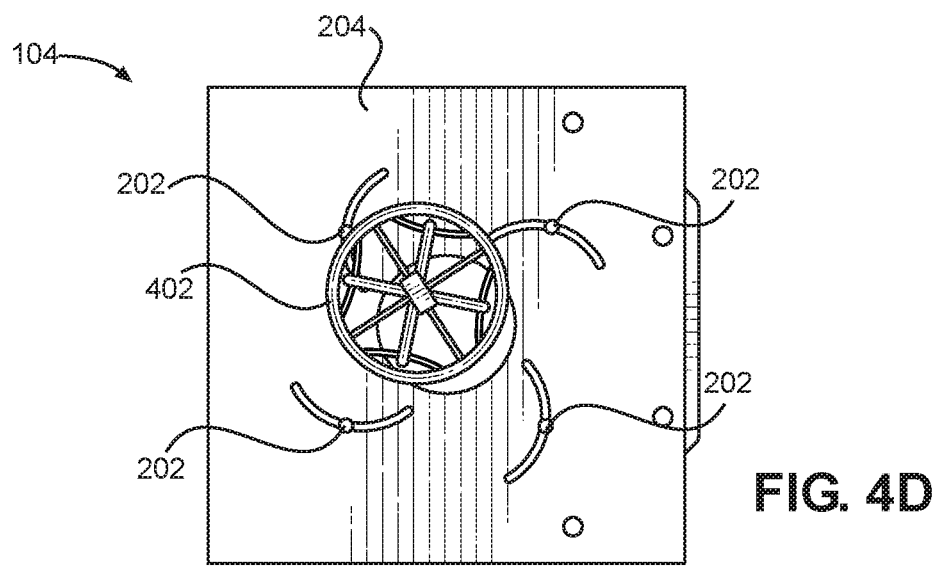

FIG. 4C shows movement of the multiple centering pins 202 along the multiple slots in top plate 204 (i.e., the multiple centering pins 202 are moving toward the center of landing platform 104). FIG. 4D shows further movement of the multiple centering pins 202 along the multiple slots in top plate 204. In the example of FIG. 4D, centering pin 202 in the upper-left portion of landing platform 104 is contacting (or engaging) a landing structure of UAV 402. As that particular centering pin 202 continues to move toward the center of landing platform 104, it will move UAV 402 toward the center of landing platform 104. In some embodiments, UAV 402 has a substantially circular landing structure. In other embodiments, the landing structure of UAV 402 has any shape or configuration that enables one or more centering pins 202 to engage the landing structure and move the UAV 402 toward the center of landing platform 104 as the multiple centering pins 202 move toward the center of landing platform 104. For example, the landing structure of UAV 402 can have any geometric shape that is completely closed or substantially closed. Example geometric shapes include a circle, an ellipse, a square, and the like. In some embodiments, the landing structure of UAV 402 is symmetrical along an axis of UAV 402.

Figure 4E:
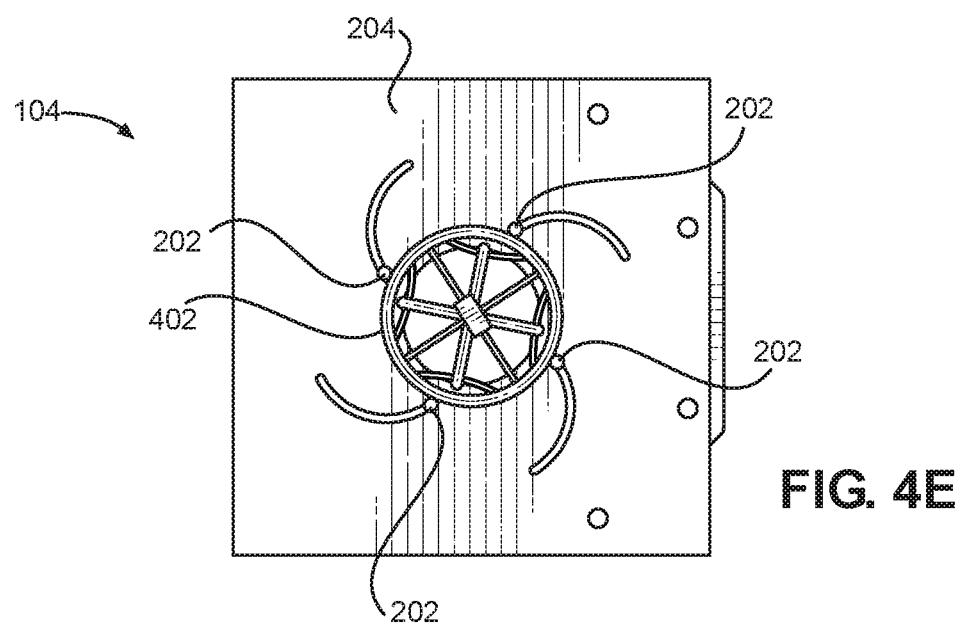

FIG. 4E shows UAV 402 centered on landing platform 104. In this example, all four centering pins 202 are engaged with the landing structure of UAV 402. Thus, UAV 402 is centered over aperture 302 in top plate 204 to allow access to the bottom of UAV 402 for loading payload, unloading payload, recharging UAV 402, and the like.

Figure 5:
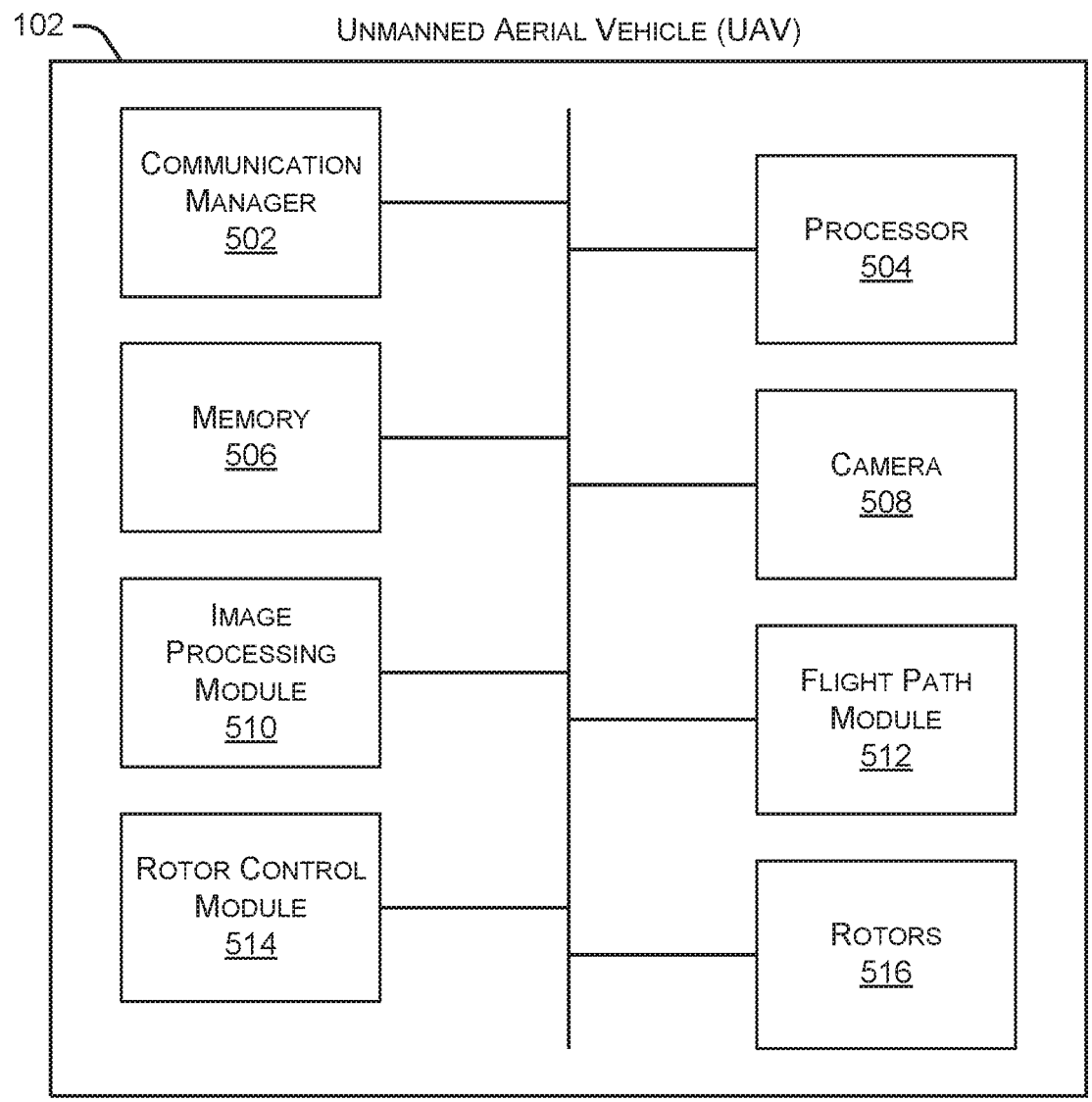
FIG. 5 is a block diagram illustrating an embodiment of a UAV.

FIG. 5 is a block diagram illustrating an embodiment of UAV 102. As shown in FIG. 5, UAV 102 includes a communication manager 502, a processor 504, and a memory 506. Communication manager 502 allows UAV 102 to communicate with other systems, such as UAV management system 108, server 110, data communication network 112, and the like. Processor 504 executes various instructions to implement the functionality provided by UAV 102, as discussed herein. Memory 506 stores these instructions as well as other data used by processor 504 and other modules and components contained in UAV 102.

UAV 102 also includes a camera 508 that captures images of the areas near UAV 102. In some embodiments, an image processing module 510 analyzes images captured by camera 508 to locate landing platforms, delivery areas, obstacles, and the like. Additionally, image processing module 510 may assist with landing UAV 102 by identifying a landing platform (or other delivery area) location and determining flight adjustments needed to successfully land UAV 102 on the landing platform. A flight path module 512 generates and maintains information related to a flight path that UAV 102 attempts to follow. In some embodiments, the flight path information is received from UAV management system 108 or server 110. A rotor control module 514 controls the operation of multiple rotors 516 associated with UAV 102. In some embodiments, UAV 102 has three or four rotors 516 that assist UAV 102 in flying between multiple locations. For example, rotor control module 514 may control the rotational speed of each rotor 516 to steer and maneuver UAV 102 to a destination, such as a landing platform or delivery location. Thus, rotor control module 514 can assist in maneuvering UAV 102 along a particular flight path, avoiding obstacles, and the like. In particular embodiments, one or more of the functions performed by rotor control module 514 are, instead, performed by UAV management system 108 or server 110, which sends appropriate rotor control instructions to rotor control module 514 for implementation. A particular UAV 102 may have any number of rotors 516.

Figure 6:
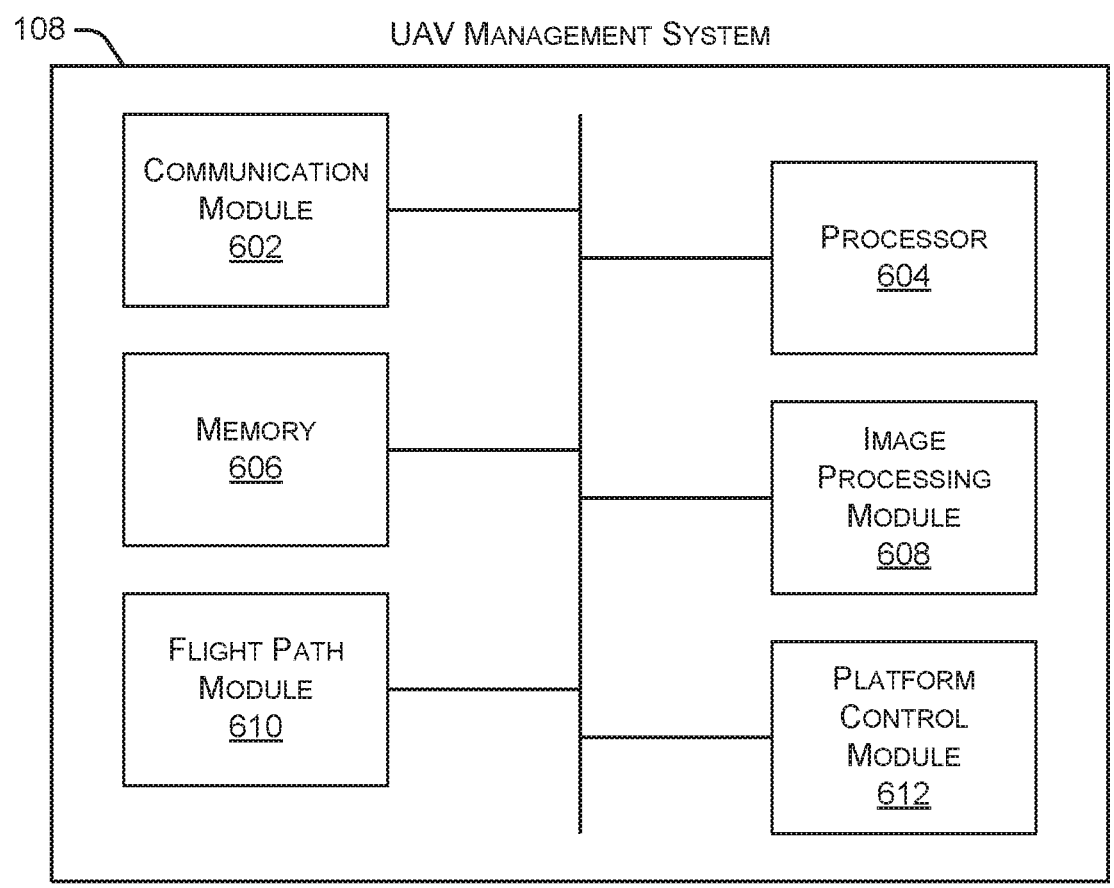
FIG. 6 is a block diagram illustrating an embodiment of a UAV management system.

FIG. 6 is a block diagram illustrating an embodiment of UAV management system 108. As shown in FIG. 6, UAV management system 108 includes a communication module 602, a processor 604, and a memory 606. Communication module 602 allows UAV management system 108 to communicate with other systems and devices, such as UAV 102, server 110, data communication network 112, and the like. Processor 604 executes various instructions to implement the functionality provided by UAV management system 108, as discussed herein. Memory 606 stores these instructions as well as other data used by processor 604 and other modules and components contained in UAV management system 108.

UAV management system 108 also includes an image processing module 608 that analyzes images captured, for example, by camera 508 in UAV 102. Image processing module 608 may assist with landing UAV 102 by identifying the location and trajectory of UAV 102 with respect to landing platform 104, and determining flight adjustments needed to successfully land UAV 102 on landing platform 104. A flight path module 610 generates and maintains information related to a flight path that UAV 102 attempts to follow. A platform control module 612 manages the operation of landing platform 104, such as controlling operation of motor 208 to move rotating plate 206 and move the multiple centering pins 202.

Figure 7:
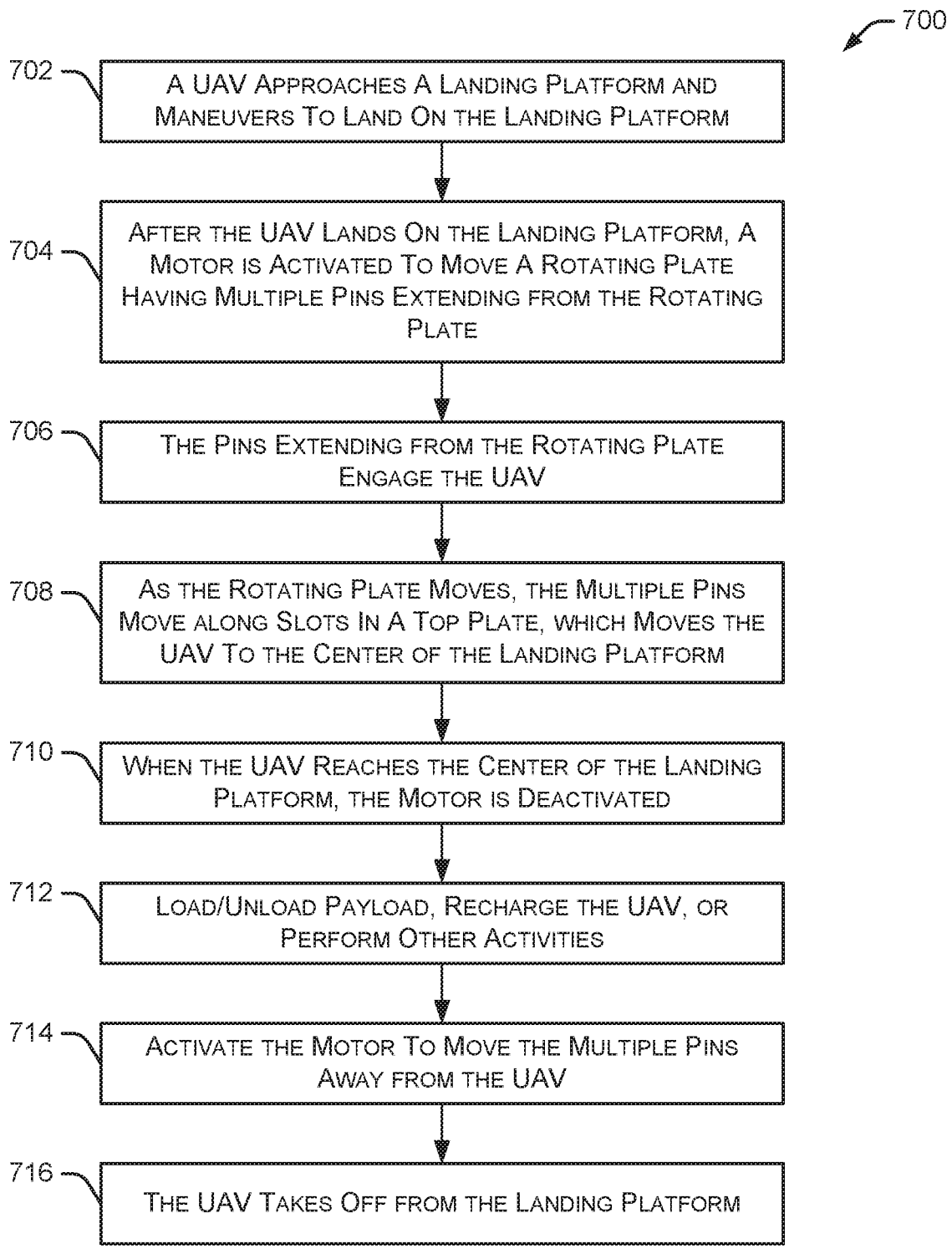
FIG. 7 is a flow diagram illustrating an embodiment of a method for landing and centering a UAV on the landing platform.

FIG. 7 is a flow diagram illustrating an embodiment of a method 700 for landing and centering a UAV on the landing platform. Initially, a UAV approaches 702 a landing platform and maneuvers to land on the landing platform. After the UAV lands on the landing platform, a motor is activated to move 704 a rotating plate having multiple centering pins extending from the rotating plate. As the multiple centering pins move, due to the movement of the rotating plate, the multiple centering pins engage 706 a landing structure of the UAV. As the multiple centering pins continue to move 708 along slots in a top plate, the UAV is moved to the center of the landing platform.

When the UAV reaches the center of the landing platform, the motor is deactivated 710. The UAV is then serviced 712 by, for example, unloading payload, loading payload, recharging the UAV (e.g., via inductive charging), and the like. In some embodiments, the UAV may remain on the landing platform for a period of time if "piggy backing" on the vehicle to ride to a different location. When the UAV is ready to take off from the landing platform, the motor is activated 714 to move the multiple centering pins away from the UAV. In this case, the motor operates in the opposite direction from the activation mentioned above such that the multiple centering pins move in the opposite direction (e.g., away from the UAV). Finally, the UAV takes off 716 from the landing platform.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. A landing platform comprising:
   a top plate configured to support an unmanned aerial vehicle (UAV), wherein the top plate has a plurality of slots therethrough;
   a rotating plate adjacent the top plate and including a plurality of centering pins extending therefrom and extending through the plurality of slots; and
   a motor configured to rotate the rotating plate to cause the plurality of centering pins to center the UAV on the top plate.

2. The landing platform of claim 1, wherein at least one of the plurality of centering pins engage a landing structure of the UAV.

3. The landing platform of claim 1, wherein the rotating plate is attached to the motor such that activation of the motor rotates the rotating plate.

4. The landing platform of claim 3, wherein activation of the motor causes at least one of the plurality of centering pins to engage a landing structure of the UAV.

5. The landing platform of claim 3, wherein activation of the rotating plate causes the plurality of centering pins to move in a spiral motion toward the center of the top plate, thereby moving the UAV toward the center of the top plate.

6. The landing platform of claim 1, wherein the plurality of centering pins are slidably attached to the rotating plate.

7. The landing platform of claim 1, further comprising:
an internal gear attached to the rotating plate; and
a pinion gear attached to the motor, wherein the pinion gear engages the internal gear to rotate the rotating plate when the motor is activated.

8. The landing platform of claim 1, wherein each of the plurality of slots are curved, and wherein each of the plurality of centering pins follow the curvature of a corresponding slot as the rotating plate is activated.

9. The landing platform of claim 1, further comprising an aperture in the center of the top plate, wherein activation of the motor causes the centering pins to engage a landing structure of the UAV and center the UAV over the aperture.

10. The landing platform of claim 9, wherein centering the UAV over the aperture provides access to the bottom of the UAV for at least one of loading payload, unloading payload, and recharging the UAV.

11. The landing platform of claim 1, further comprising an aperture in the center of the top plate, wherein the motor is offset from the aperture such that the motor does not obstruct access to the UAV through the aperture.

12. The landing platform of claim 1, wherein the landing platform is mounted to the top of a vehicle.

13. A landing platform comprising:
a top plate configured to support an unmanned aerial vehicle (UAV), wherein the top plate has a plurality of slots therethrough;
a rotating plate adjacent the top plate and including a plurality of centering pins slidably attached to the rotating plate, wherein the plurality of centering pins extend from the rotating plate and through the plurality of slots in the top plate; and
a motor configured to rotate the rotating plate to cause the plurality of centering pins to engage a landing structure of the UAV and center the UAV on the top plate.

14. The landing platform of claim 13, wherein the rotating plate is attached to the motor such that activation of the motor rotates the rotating plate.

15. The landing platform of claim 14, wherein the activation of the motor causes the plurality of centering pins to move in a spiral motion toward the center of the top plate, thereby moving the UAV toward the center of the top plate.

16. The landing platform of claim 13, further comprising:
an internal gear attached to the rotating plate; and
a pinion gear attached to the motor, wherein the pinion gear engages the internal gear to rotate the rotating plate when the motor is activated.

17. The landing platform of claim 13, further comprising an aperture in the center of the top plate, wherein activation of the motor causes the centering pins to engage a landing structure of the UAV and center the UAV over the aperture.

18. A method comprising:
responsive to an unmanned aerial vehicle (UAV) landing on a top plate of a landing platform, activating a motor associated with the landing platform to move a rotating plate having a plurality of centering pins extending from the rotating plate, wherein activating the motor moves the plurality of centering pins along a plurality of slots in the top plate of the landing platform;
maintaining activation of the motor to continue moving the plurality of centering pins along the plurality of slots to move the UAV toward the center of the landing platform; and
deactivating the motor when the UAV reaches the center of the landing platform.

19. The method of claim 18, wherein maintaining activation of the motor causes the plurality of centering pins to move in a spiral motion toward the center of the landing platform.

20. The method of claim 18, wherein activating the motor includes rotating a pinion gear attached to the motor, wherein the pinion gear engages an internal gear attached to the rotating plate.

\* \* \* \* \*